United States Patent
Fukuda et al.

(10) Patent No.: US 7,339,606 B2
(45) Date of Patent: Mar. 4, 2008

(54) IMAGE CAPTURING APPARATUS, MAIN SUBJECT POSITION DETERMINATION METHOD, AND COMPUTER-READABLE MEDIUM STORING PROGRAM

(75) Inventors: Hiroshi Fukuda, Saitama (JP); Atsuhiko Ishihara, Saitama (JP); Koichi Sakamoto, Saitama (JP); Hisayoshi Tsubaki, Saitama (JP); Mikio Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 902 days.

(21) Appl. No.: 10/350,030

(22) Filed: Jan. 24, 2003

(65) Prior Publication Data

US 2003/0142224 A1 Jul. 31, 2003

(30) Foreign Application Priority Data

Jan. 29, 2002 (JP) .............................. 2002-020675

(51) Int. Cl.
*H04N 7/18* (2006.01)
(52) U.S. Cl. .................... 348/143; 348/155; 348/207.2
(58) Field of Classification Search ............ 348/208.14
See application file for complete search history.

(56) References Cited

U.S. PATENT DOCUMENTS

| | | | |
|---|---|---|---|
| 6,750,911 B1 * | 6/2004 | Kobayashi et al. ......... | 348/273 |
| 6,924,832 B1 * | 8/2005 | Shiffer et al. ................ | 348/36 |
| 6,999,115 B1 * | 2/2006 | Katoh ...................... | 348/222.1 |
| 2001/0012449 A1 * | 8/2001 | Kawabe et al. ............. | 396/234 |
| 2002/0071594 A1 * | 6/2002 | Kool et al. .................. | 382/103 |
| 2006/0098889 A1 * | 5/2006 | Luo et al. ................... | 382/254 |

FOREIGN PATENT DOCUMENTS

| | | |
|---|---|---|
| JP | 03-207174 A | 9/1991 |
| JP | 4-179937 A | 6/1992 |
| JP | A 05-158132 | 6/1993 |
| JP | 7-99602 A | 4/1995 |
| JP | 08-029826 A * | 2/1996 |
| JP | 11-136568 A | 5/1999 |
| JP | 2000-330184 A | 11/2000 |

OTHER PUBLICATIONS

Office Action issued by Japanese Patent Office on Mar. 13, 2007, for corresponding Japanese Application No. 2002-020675.

* cited by examiner

*Primary Examiner*—Lin Ye
*Assistant Examiner*—Anthony J Daniels
(74) *Attorney, Agent, or Firm*—Sughrue Mion, PLLC

(57) ABSTRACT

An image capturing apparatus for accurately determining a position of a main subject on an image. The image capturing apparatus for capturing a subject includes an image pick-up unit for capturing a preliminary image and a final image; a main subject recognition unit for recognizing a main subject from the subject on the preliminary image; and a main subject position determination unit for determining a position of the main subject on the final image.

14 Claims, 8 Drawing Sheets

IMAGE CAPTURING APPARATUS, MAIN SUBJECT POSITION DETERMINATION METHOD, AND COMPUTER-READABLE MEDIUM STORING PROGRAM

This patent application claims priority from a Japanese patent application No. 2002-020675 filed on Jan. 29, 2002, the contents of which are incorporated herein by reference.

BACKGROUND OF THE INVENTION

1. Field of the Invention

The present invention relates to an image capturing apparatus, a main subject position determination method, and a computer readable medium storing program. More particularly, the present invention relates to an image capturing apparatus, a main subject position determination method, and a computer readable medium storing program which detect a position of a main subject on the image accurately.

2. Description of Related Art

A printer, which prints images photographed by an image capturing apparatus. performs image processing on the image such as density correction, color balance compensation, edge enhancement, and/or noise reduction. However, since appropriate image processing may not be performed to a main subject on the image when the image processing is performed on entire part of the image uniformly, an image capturing apparatus is disclosed which determines a position of the main subject on the image, associates the position with the image, and outputs the image to a printer. For example, a Japanese patent application publication No. 5-158132 discloses a main subject information recording camera which determines and records a main subject on an image by detecting a visual axis of eyes of a photographer or color of skin of the subject, or by an operation by a user.

A conventional digital camera acquires a preliminary image by capturing a subject, analyzes the acquired preliminary image and determines capturing conditions, such as a focal point and status of an electric flash. Then the final image is acquired by capturing the subject using the determined capturing conditions. Therefore, it is difficult for the conventional digital camera to determine a main subject on the final image accurately.

SUMMARY OF THE INVENTION

Therefore, it is an object of the present invention to provide an image capturing apparatus, a main subject position determination method, and a computer readable medium storing program which can solve the foregoing problem. The above and other objects can be achieved by combinations described in the independent claims. The dependent claims define further advantageous and exemplary combinations of the present invention.

According to the first aspect of the present invention, there is provided an image capturing apparatus for capturing a subject. The image capturing apparatus includes an image pick-up unit for capturing a first image and a second image; a main subject recognition unit for recognizing a main subject from the subject on the first image; and a main subject position determination unit for determining a position of the main subject on the second image.

The image capturing apparatus may further include an image capturing condition determination unit for analyzing the first image and for determining image capturing condition. The image pick-up unit may capture the second image based on the image capturing condition. The image capturing apparatus may further include a storing unit for associating the position of the main subject determined by the main subject position determination unit with the second image and for storing the position of the main subject and the second image.

The main subject position determination unit may identify a point as the position of the main subject. The main subject position determination unit may identify a circular area as the position of the main subject. The main subject position determination unit may identify a rectangular area as the position of the main subject.

The main subject recognition unit may recognize an area including a focused area on the first image as the main subject. The main subject recognition unit may recognize the focused area and a circumferential area around the focused area on the first image as the main subject. The main subject recognition unit may recognize the focused area and an area containing the same color as that of the focused area as the main subject.

The main subject recognition unit may recognize the main subject by detecting a visual axis of eyes of a photographer. The main subject recognition unit may recognize the main subject by detecting color of skin of the subject.

The image pick-up unit may further capture a third image after the acquisition of the first image and before the acquisition of the second image, the main subject position determination unit may determine a position of the main subject on the third image based on the position of the main subject on the first image, and may determine a position of the main subject on the second image based on the position of the main subject on the third image.

According to the second aspect of the present invention, there is provided a main subject position determination method for determining a position of a main subject from a subject on an image. The main subject position determination method includes steps of capturing a first image; recognizing a main subject from the subject on the first image captured in the first-image capturing step; capturing a second image; and determining a position of the main subject on the second image.

According to the third aspect of the present invention, there is provided a computer readable medium storing thereon a program for an image capturing apparatus which captures a subject. The program includes an image pick-up module for allowing the image capturing apparatus to capture a first image and a second image; a main subject recognition module for allowing the image capturing apparatus to recognize a main subject from the subject on the first image; and a main subject position determination module for allowing the image capturing apparatus to determine a position of the main subject on the second image.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
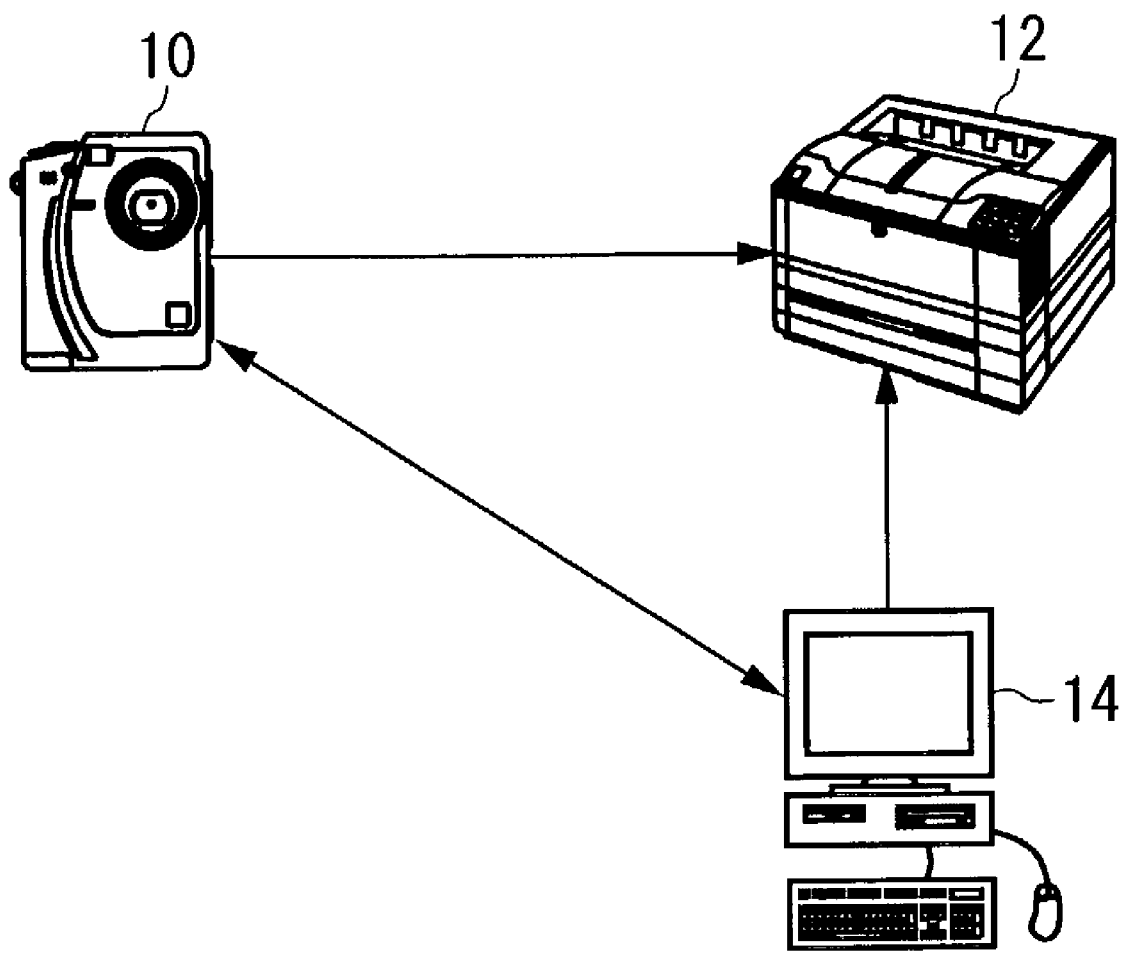
FIG. 1 is a conceptual diagram of an image processing system according to an embodiment of the present invention.

FIG. 1 is a conceptual diagram of an image processing system according to an embodiment of the present invention. The image processing system includes a digital camera 10, a printer 12, and a personal computer 14. The digital camera 10, the printer 12, and the personal computer 14 communicate with one another through a data transmission line. The data transmission line is, for example, a cable communication medium, such as IEEE 1394 or USB, or a radio communication medium, such as IrDA, Bluetooth or wireless LAN. The data transmission line may be a network which includes a plurality of cable communication media and radio communication media, e.g., the Internet. A record medium, such as removable medium, may be used for delivery of the data among the digital camera 10, the printer 12, and the personal computer 14.

The digital camera 10 captures an image of a subject and transmits the captured image data to the printer 12 or the personal computer 14. The digital camera 10 also attaches such as image capturing condition information and main subject position information to the image data. The image capturing condition information indicates such as, a status of the digital camera 10 at the time of the capturing of the image of the subject. The main subject position information indicates a position of the main subject on the image. Then, the digital camera 10 transmits them to the printer 12 or the personal computer 14. The printer 12 or the personal computer 14 performs image processing on the received image data based on the image capturing condition information and/or the main subject position information, and outputs the image data. That is, the printer 12 prints out the image data, and the personal computer 14 outputs the image data on a display. The personal computer 14 transmits setting information to the digital camera 10 or the printer 12 to change the setting information of the digital camera 10 or the printer 12.

The digital camera 10 is an example of the image capturing apparatus and/or the image processing apparatus, and the printer 12 and the personal computer 14 are examples of the image processing apparatus. The image capturing apparatus may be a digital still camera which photographs a still image, and may be a digital camcorder which takes movies. The image processing apparatus may be a printer for a photo processing shop, which automatically adjusts the quality of the image captured by the digital camera, and prints the image out.

Figure 2:
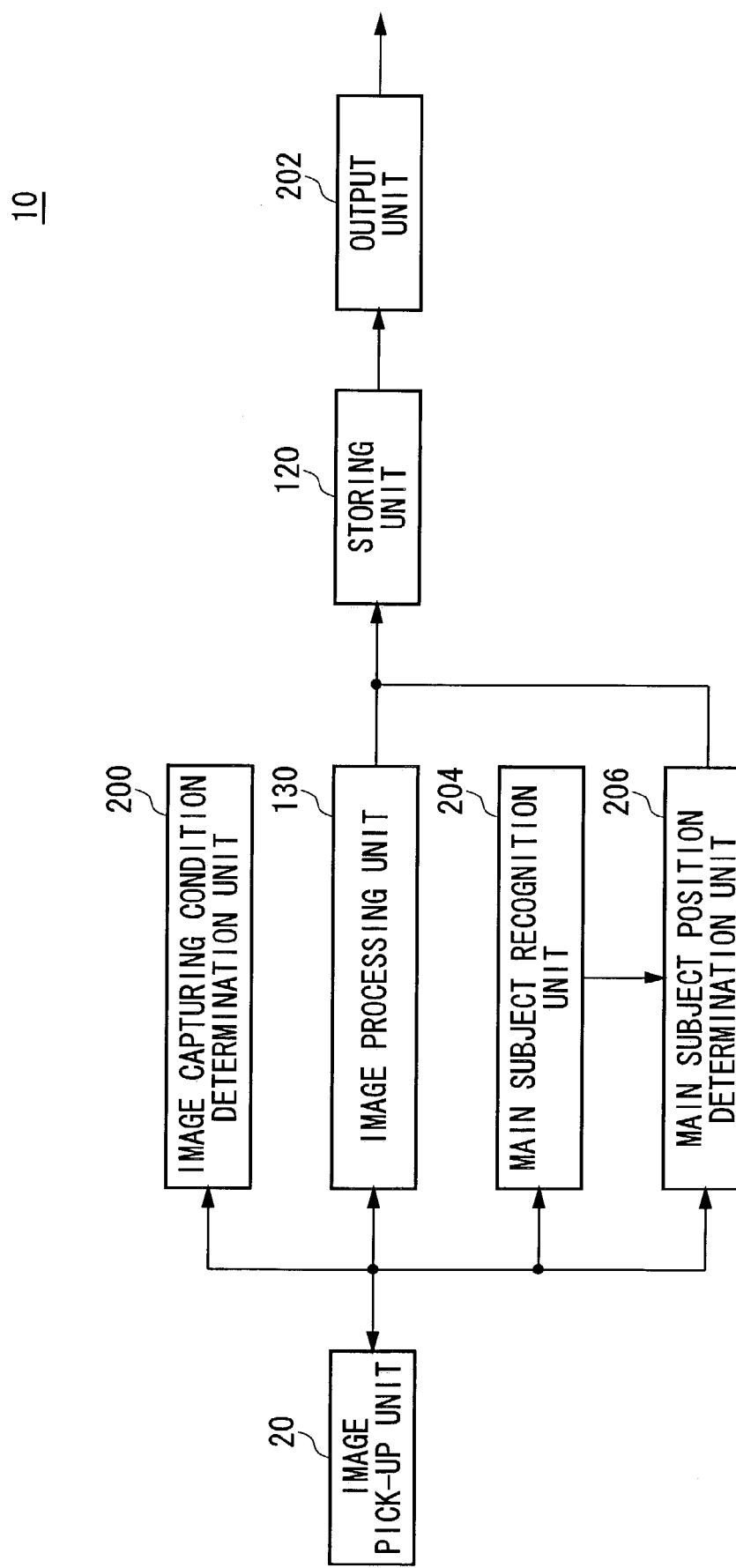
FIG. 2 is a block diagram showing a functional configuration of a digital camera according to the present embodiment.

FIG. 2 is a block diagram showing a functional configuration of the digital camera 10 according to the present embodiment. The digital camera 10 includes an image pick-up unit 20, an image processing unit 130, a storing unit 120, an image capturing condition determination unit 200, an output unit 202, a main subject recognition unit 204, and a main subject position determination unit 206.

The image pick-up unit 20 captures a preliminary image of a subject based on operation of a user. Then the image capturing condition determination unit 200 analyzes the preliminary image captured by the image pick-up unit 20, and determines image capturing conditions. The main subject recognition unit 204 recognizes a main subject from the subject on the preliminary image captured by the image pick-up unit 20. For example, the main subject recognition unit 204 recognizes an area including a focused area on the preliminary image as the main subject. Specifically, the main subject recognition unit 204 may recognize the focused area and a circumferential area around the focused area on the preliminary image as the main subject. Alternatively, the main subject recognition unit 204 may recognize the focused area and an area containing the same color as that of the focused area on the preliminary image as the main subject. In another example, the main subject recognition unit 204 may recognize the main subject in a preliminary image by detecting a visual axis of eyes of a photographer and/or color of skin in the subject.

Next, the image pick-up unit 20 captures the final image of the subject based on the image capturing condition determined by the image capturing condition determination unit 200. The image processing unit 130 performs image processing on the final image captured by the image pick-up unit 20. The main subject position determination unit 206 determines the position of the main subject on the final image captured by the image pick-up unit 20, in which the position of the main subject is recognized by the main subject recognition unit 204 by the preliminary image. Specifically, the main subject position determination unit 206 may identify a certain point as the position of the main subject on the final image.

In another example, the main subject position determination unit 206 may identify a central point and a radius of a circular area, or a central point and length of sides of a rectangular area as the position of the main subject.

The storing unit 120 associates the position of the main subject determined by the main subject position determination unit 206 with the final image outputted by the image processing unit 130, and stores them. Also, the storing unit 120 further stores the image capturing conditions such as brightness of the subject, status of an electric flash, a subject distance, a focal length and a sensitivity, in association with the final image captured by the image pick-up unit 20.

The output unit 202 outputs the final image stored in the storing unit 120 to the external equipment such as a memory card or the printer 12. The output unit 202 further outputs the main subject position information indicating the position of the main subject on the final image and the image capturing condition information indicating the image capturing conditions in association with the final image so as to allow the external image processing apparatus such as the printer 12 to perform image processing properly.

Figure 3:
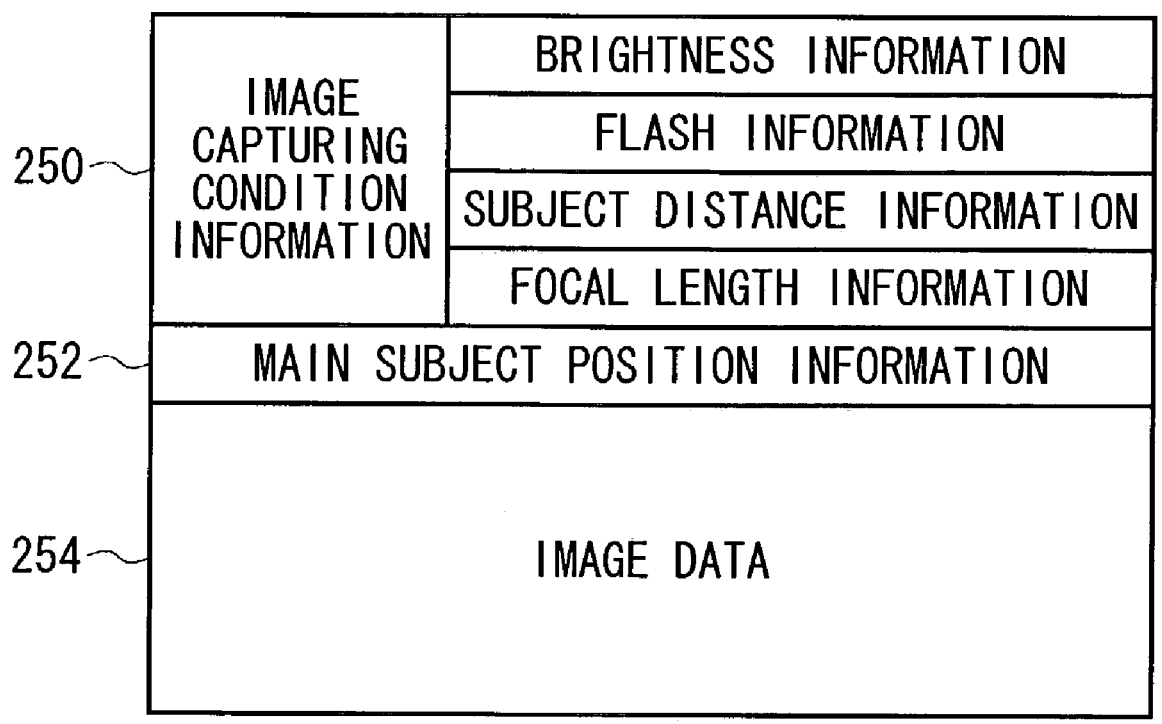
FIG. 3 is an example of a format of data outputted from an output unit.

FIG. 3 is an example of a format of data outputted from the output unit 202. The data outputted from the output unit 202 includes tag information having the image capturing condition information 250 and the main subject position information 252, and image data 254. The image capturing condition information 250 includes brightness information, flash information, subject distance information, and focal length information. The brightness information indicates brightness of the subject. The flash information indicates whether the electric flash is used at the time of capturing. The subject distance information indicates a distance to the subject from the digital camera 10 at the time of capturing. The focal length information indicates focal length at the time of capturing. The main subject position information 252 indicates the position of the main subject on the image. The image data 258 is data in which the image is stored, e.g., data in JPEG form.

Figure 4:
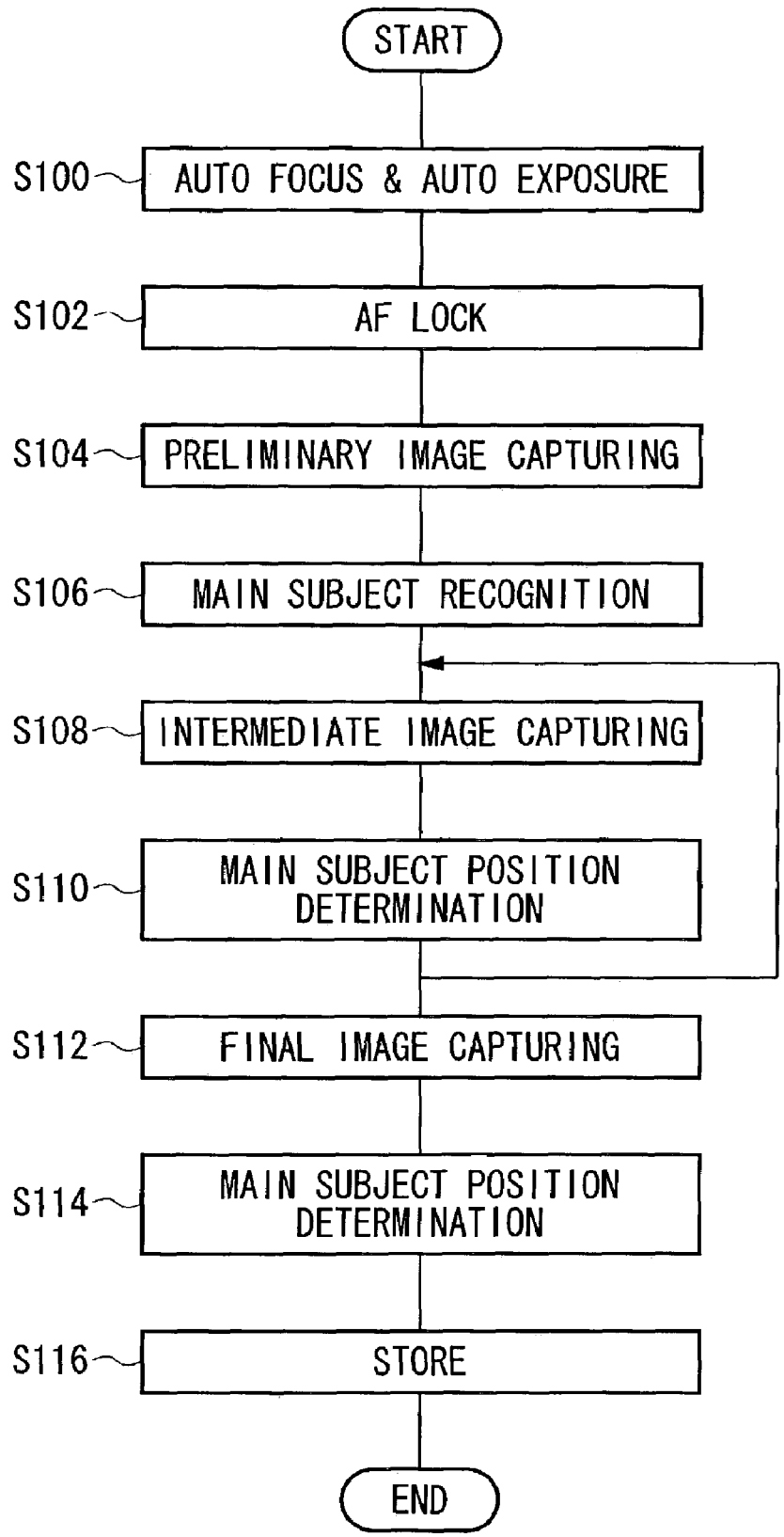
FIG. 4 is an example of a flowchart of a main subject position determination method of the digital camera according to the present invention.
Figure 5A:
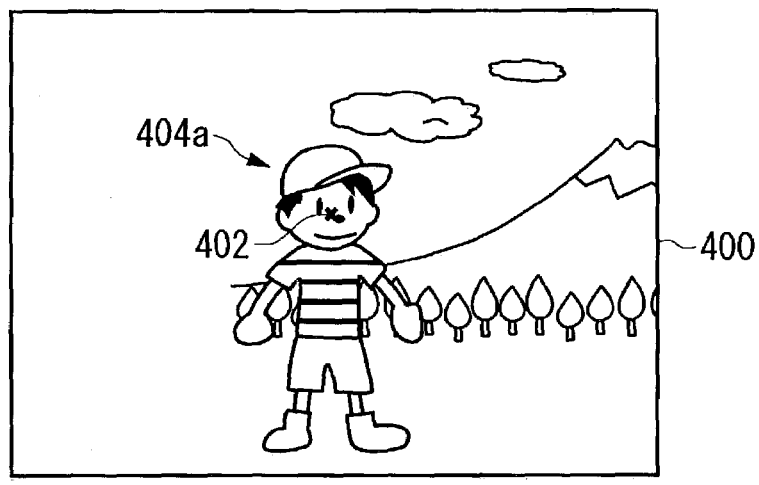
FIGS. 5A, 5B and 5C are examples of images captured by an image pick-up unit according to the present embodiment.
Figure 5B:
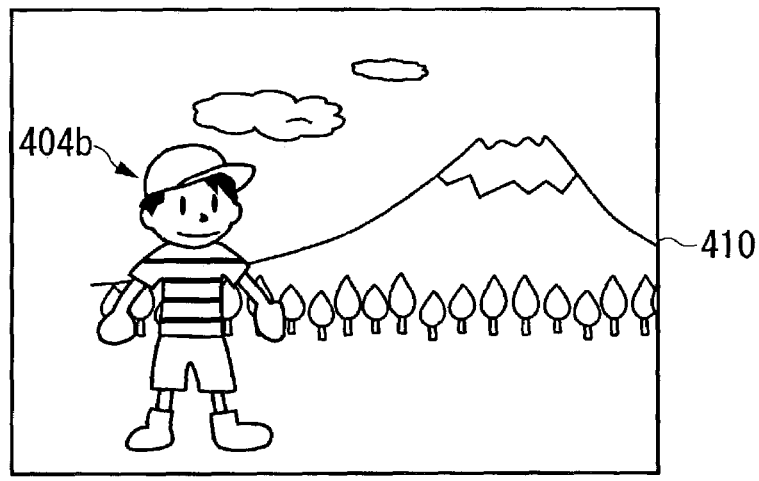
Figure 5C:
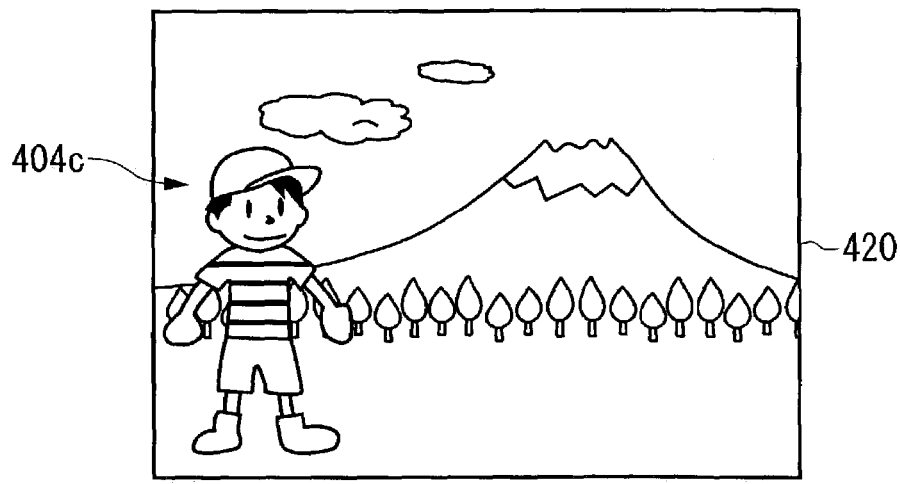

FIG. 4 is an example of a flowchart of a main subject position determination method of the digital camera 10 according to the present invention. FIGS. 5A, 5B and 5C are examples of images captured by the image pick-up unit 20 according to the present embodiment.

First, a user adjusts direction of the digital camera 10 to focus the digital camera 10 on a main subject 404a. Then the digital camera 10 performs automatic-focusing and automatic-exposure based on operation of the user (S100). Then, based on operation of the user, focus of the digital camera 10 is locked on the main subject 404a selected by the user (to be referred to as "AF lock" hereinafter) (S102). Then the image pick-up unit 20 captures the preliminary image 400 as shown in FIG. 5A with the AF lock (S104).

Next, the main subject recognition unit 204 recognizes the main subject 404a from the subject on the preliminary image 400 captured by the image pick-up unit 20 (S106). Specifically, the main subject recognition unit 204 recognizes an area including a focused area 402 on the preliminary image 400 as the main subject 404a.

Next, direction of the digital camera 10 is adjusted with the AF lock so as to frame the subject. At this time, the image pick-up unit 20 captures an intermediate image 410 as shown in FIG. 5B (S108). Then the main subject position determination unit 206 determines the position of a main subject 404b on the intermediate image 410 based on the position of the main subject 404a on the preliminary image 400 (S110). While the user is adjusting the direction of the digital camera 10, it is preferable that the digital camera 10 captures a plurality of intermediate images 410 by repeating the steps S108 and S110 for multiple times and follows the position of the main subject 404b on the plurality of intermediate images 410. Moreover, when main subject 404b is framed out of the acquired intermediate images 410 due to excessive direction change of the digital camera, the digital camera 10 may notify the user that the main subject 404b have been framed out.

Next, after the subject is framed, the image pick-up unit 20 captures a final image 420 as shown in FIG. 5C based on operation of the user (S112). Then, the main subject position determination unit 206 determines the position of a main subject 404c on the final image 420 based on the position of the main subject 404b on the intermediate image 410 (S114). Then, the storing unit 120 associates the main subject position information indicating the position of the main subject 404c on the final image 420 with the final image, and stores them (S116).

According to the digital camera 10 of the present embodiment, the main subject position information is provided to the printer 12 in association with the final image, in which the main subject position information indicates the position of the main subject 404c on the final image. Therefore, the printer 12 performs image processing appropriately on the image by using the main subject position information acquired from the digital camera 10.

Figure 6:
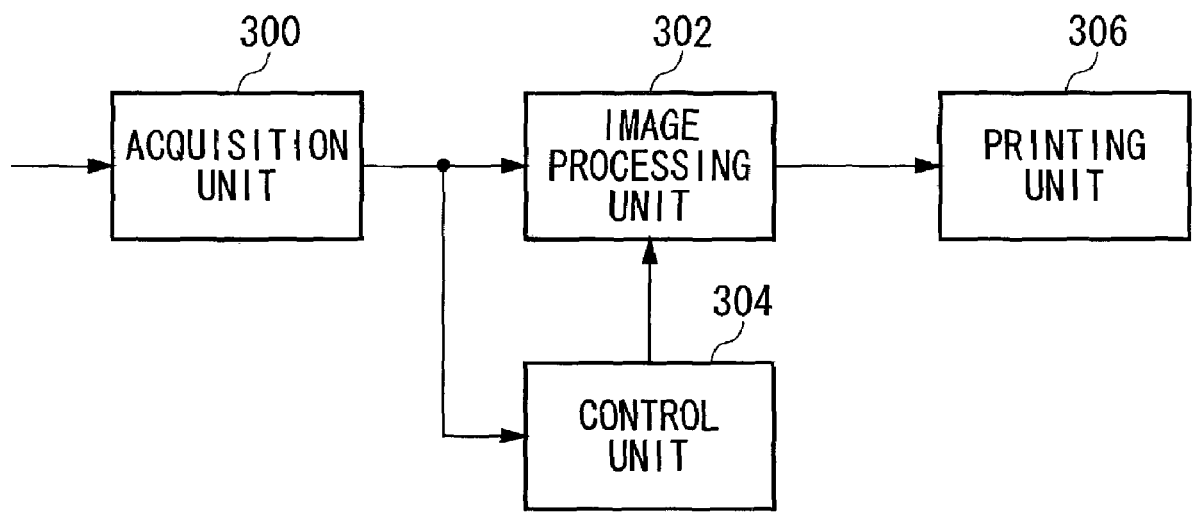
FIG. 6 is a block diagram showing a functional configuration of a printer according to the present embodiment.

FIG. 6 is a block diagram showing a functional configuration of the printer 12 according to the present embodiment. The printer 12 includes an acquisition unit 300, an image processing unit 302, a control unit 304, and a printing unit 306.

The acquisition unit 300 acquires the final image and the associated main subject position information indicating the position of the main subject on the final image from the external equipment such as the memory card or the digital camera 10. For example, the acquisition unit 300 acquires a point of a coordinate plane on the final image as the main subject position information.

The control unit 304 controls a procedure for the image processing on the image, which is performed by the image processing unit 302, based on the main subject position acquired by the acquisition unit 300. Specifically, based on the main subject position information, the control unit 304 controls the image processing unit 302 so as to obtain desired image quality of the subject on the final image.

The image processing unit 302 performs noise reduction on the image acquired by the acquisition unit 300 based on instruction of the control unit 304. Then the printing unit 306 prints the image, on which the noise reduction is performed by the image processing unit 302.

In another example of the image processing system of the present embodiment, the image processing system may include a displaying apparatus, such as a CRT, a liquid crystal display, a plasma display, various types of electronic papers, or an organic electroluminescence display, instead of the printer 12. The displaying apparatus, such as the CRT, the liquid crystal display, the plasma display, various types of the electronic papers, or the organic electroluminescence display, is an example of the image processing apparatus. The displaying apparatus of this example includes an acquisition unit, an image processing unit, a control unit and a displaying unit. Explanation of the operation of the acquisition unit, the image processing unit and the control unit, which are included in the displaying apparatus, is omitted since the operation of each of the unit is the same as that of the acquisition unit 300, the image processing unit 302 and the control unit 304 respectively, which are included in the printer 12 explained in FIG. 6. The displaying unit of the displaying apparatus converts the image into the data format for displaying and displays the image, on which the image processing being performed by the image processing unit.

Figure 7:
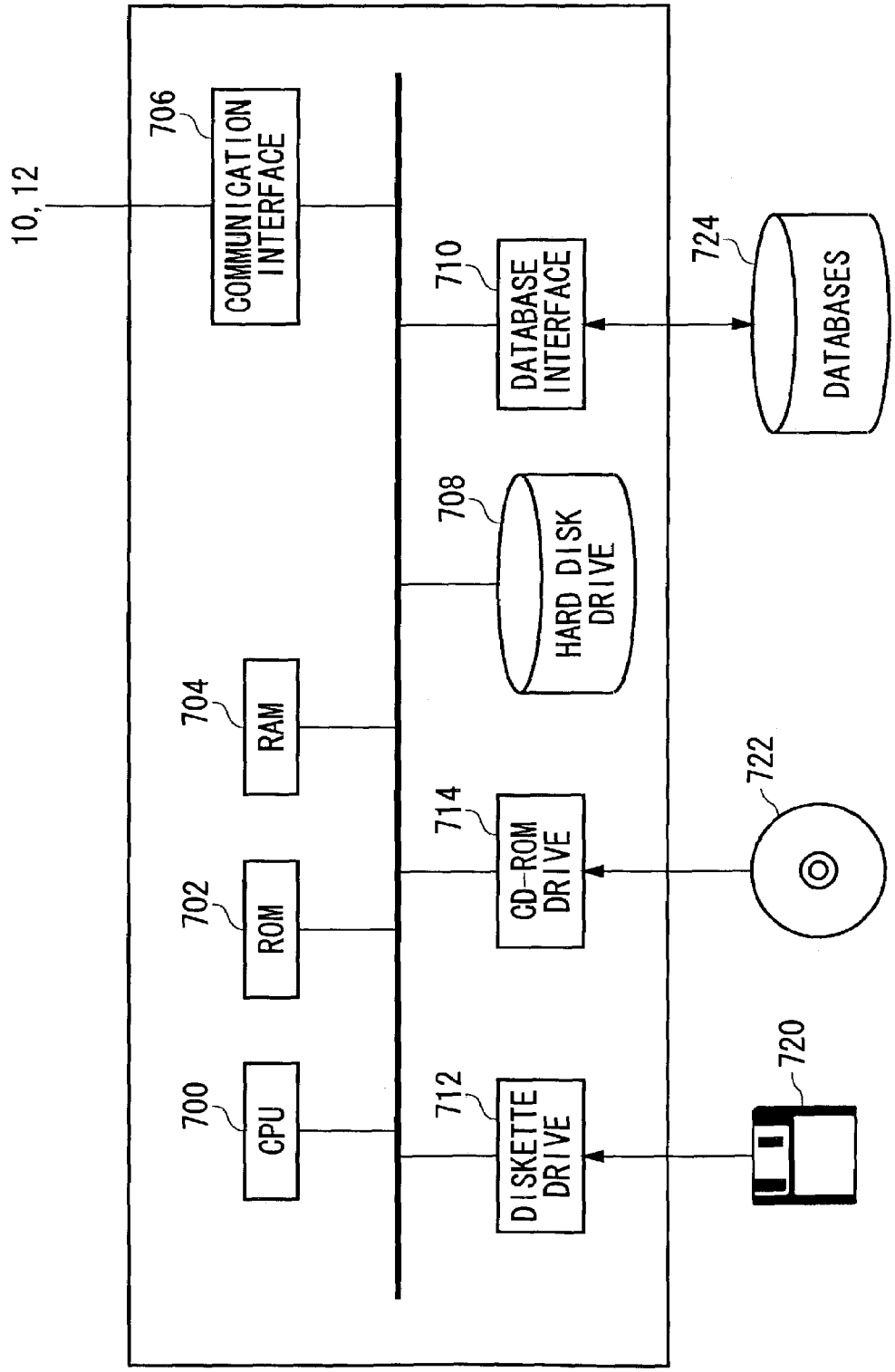
FIG. 7 is a block diagram showing an example of a hardware configuration of a personal computer according to the present embodiment.

FIG. 7 is a block diagram showing an example of a hardware configuration of the personal computer 14 according to the present embodiment. The personal computer 14 includes CPU 700, ROM 702, RAM 704, a communication interface 706, a hard disk drive 708, a database interface 710, a diskette drive 712, and a CD-ROM drive 714. The CPU 700 operates based on a program stored in the ROM 702 and the RAM 704, and controls each unit. The personal computer 14 communicates with the digital camera 10 and the printer 12 through the communication interface 706. The database interface 710 writes data in a database, and updates the contents of the database.

The diskette drive 712 reads data or a program in a diskette 720, and provides the data or the program to the communication interface 706. The CD-ROM drive 714 reads data or a program in CD-ROM 722, and provides the data or the program to the communication interface 706. The communication interface 706 transmits the data or the program provided by the diskette drive 712 or the CD-ROM drive 714 to the digital camera 10 or the printer 12. The database interface 710 connects with various databases 724, and transmits and receives data to/from the databases 724.

The program for the printer 12 is provided by a user, being stored in a record medium such as the diskette 720 or the CD-ROM 722. The program stored in the record medium may be either compressed or decompressed. The program is read from the record medium, installed in the digital camera 10 or the printer 12 through the communication interface 706, and executed in the digital camera 10 or the printer 12.

The program in the record medium, which is installed in the digital camera 10, includes an image pick-up module, an image capturing condition determination module, an image processing module, a main subject recognition module, a main subject position determination module, a storing module, and an output module as a functional configuration. Since the function of the modules, by which the digital camera 10 is manipulated, is the same as the operation of the corresponding components in the digital camera 10 explained by FIGS. 1-6, explanation of the function of the modules is omitted.

The program in the record medium, which is installed in the printer 12, includes an acquisition module, an image processing module, a control module, and a printing module as a functional configuration. Since the function of the modules, by which the printer 12 is manipulated, is the same as the operation of the corresponding component in the printer 12 explained by FIGS. 1 to 6, explanation of the function of the modules is omitted.

A part or all functions of the operation of the digital camera 10 or the printer 12 in the present embodiment explained in this patent application are storable in the diskette 720 or the CD-ROM 722, which are examples of the record media depicted in FIG. 7.

These programs may be read from the record medium and be executed directly by the digital camera 10 or the printer 12, or may be executed after the programs are installed in the digital camera 10 or the printer 12. The programs may be stored either on a single record medium or a plurality of record media. The programs may be stored in an encoded form.

It is possible to use an optical record medium such as DVD or PD, a magneto-optical record medium such as Minidisk, a tape medium, a magnetic record medium or a semiconductor memory such as an IC card or a Miniature Card as a record medium instead of the diskette or the CD-ROM. A storage device, such as a hard disk or RAM in a server system on a dedicated communication network or the Internet, may be used as a record medium and the program may be provided to the digital camera 10 or the printer 12 via the communication network.

Figure 8:
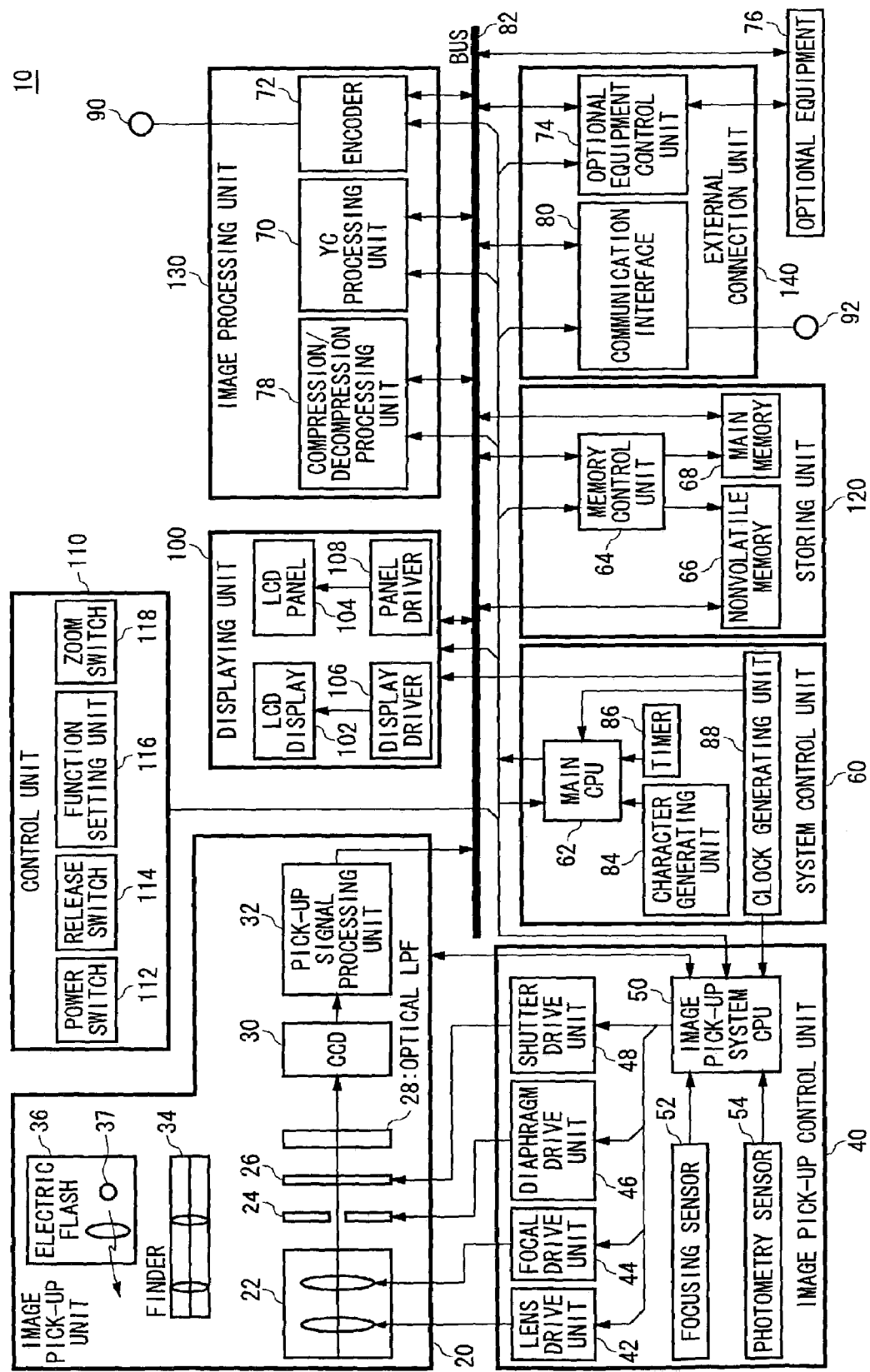
FIG. 8 is a block diagram showing an example of a detailed configuration of the digital camera according to the present embodiment.

FIG. 8 is a block diagram showing an example of a detailed configuration of the digital camera 10 according to the present embodiment. The digital camera 10 includes the image pick-up unit 20, an image pick-up control unit 40, a system control unit 60, a displaying unit 100, a control unit 110, the storing unit 120, the image processing unit 130, and an external connection unit 140.

The image pick-up unit 20 includes a taking-lens unit 22, a diaphragm 24, a shutter 26, optical LPF 28 (low pass filter), CCD 30 (charge-coupled device), a pick-up signal processing unit 32, a finder 34, and an electric flash 36.

The taking-lens unit 22 takes and processes a subject image. The taking-lens unit 22 includes a focal lens, a zoom lens, etc., and forms the image of the subject onto surface of the CCD 30. The diaphragm 24 limits the light which passed the taking-lens unit 22, and the optical LPF 28 passes light having longer wavelength component than a predetermined wavelength. Each sensor element of the CCD 30 stores charge according to quantity of light of the formed subject image (the charge is referred to as "stored charge" hereinafter).

The shutter 26 is a mechanical shutter and controls whether to form the image of the light onto the CCD 30, the light passing the taking-lens unit 22. The digital camera 10 may include an electronic shutter function instead of the mechanical shutter 26. In order to realize the electronic shutter function, the sensor element of the CCD 30 has a shutter gate and a shutter drain. The stored charge is discharged to the shutter drain by turning on the shutter gate. Time of storing the charge to each of the sensor, i.e., shutter speed, is controllable by controlling the shutter gate. In the CCD 30, the stored charge is read by a shift register by applying a readout gate pulse, and is read sequentially as a voltage signal by applying the register transfer pulse.

The pick-up signal processing unit 32 separates the voltage signal indicating the subject image outputted from the CCD 30, i.e., an analog signal, into R, G, and B components. The pick-up signal processing unit 32 adjusts white balance of the subject image by adjusting R, G, and B components. The pick-up signal processing unit 32 performs gamma correction of the subject image. The pick-up signal processing unit 32 may perform sensitivity amplification on the subject image. The pick-up signal processing unit 32 converts the analog signal, which is separated into R, G, and B components, to a digital signal, and image data of the digital signal of the subject image (referred to as "digital image data" hereinafter), obtained by the A/D conversion, is outputted to the system control unit 60.

The finder 34 may have a displaying means and may display various information from below-mentioned main CPU 62, etc. The electric flash 36 includes a discharge tube 37, which discharges energy stored in a capacitor, and when the energy is supplied to the discharge tube 37, the electric flash 36 functions by the discharge tube 37 emitting light.

The image pick-up control unit 40 includes a lens drive unit 42, a focal drive unit 44, a diaphragm drive unit 46, a shutter drive unit 48, an image pick-up system CPU 50 which controls the drive units above, a focusing sensor 52, and a photometry sensor 54. The image pick-up system CPU 50 is an example of the image pick-up condition judging unit 200. The lens drive unit 42, the focal drive unit 44, the diaphragm drive unit 46, and the shutter drive unit 48 include driving means, such as a stepping motor, and drive mechanical components in the image pick-up unit 20. According to depression of a below-mentioned release switch 114, the focusing sensor 52 measures distance to the subject, and the photometry sensor 54 measures brightness of the subject. The focusing sensor 52 and the photometry sensor 54 supply focusing data and photometry data to the image pick-up system CPU 50, where the focusing data means the data of the measured distance to the subject, and the photometry data means the data of the measured brightness of the subject.

The image pick-up system CPU 50 controls the lens drive unit 42 and the focal drive unit 44, and adjusts a zoom magnification and a focus of the taking lens 22 based on photography information, such as a zoom magnification directed by a user. Alternatively, the image pick-up system CPU 50 may control the lens drive unit 42 and the focal drive unit 44, and may adjust a zoom magnification and a focus based on the focusing data received from the focusing sensor 52 and/or the photometry data received from the photometry sensor 54.

The image pick-up system CPU 50 determines stop and shutter speed based on an integral value of the R, G, and B digital signals in one image frame, i.e., automatic exposure (AE) information. The diaphragm drive unit 46 and the shutter drive unit 48 control the aperture size of the diaphragm 24, and the opening and closing of the shutter 26 according to the determined value.

The image pick-up system CPU 50 controls light emission of the electric flash 36 based on the photometry data, and adjusts the aperture size of the diaphragm 26 simultaneously. When the user instructs to take an image, the CCD 30 starts to store the charge and outputs the stored charge to the pick-up signal processing unit 32 after the shutter time calculated from the photometry data is elapsed.

The system control unit 60 includes main CPU 62, a character generating unit 84, a timer 86, and a clock generating unit 88. The main CPU 62 controls entire parts of the digital camera 10, especially the system control unit 60. The main CPU 62 sends and receives required information to/from the image pick-up systems CPU 50 by serial communication or the like.

The clock generating unit 88 generates an internal clock of the main CPU 62, and supplies it to the main CPU 62. The clock generating unit 88 also generates internal clocks of the image pick-up system CPU 50 and the displaying unit 100. The clock generating unit 88 may supply the clocks having different frequencies to the main CPU 62, the image pick-up system CPU 50, and the displaying unit 100, respectively.

The character generating unit 84 generates text and graphic information, which is superimposed onto the photographed image, such as date/time or a title of the image. A timer 86 has backing of battery etc., counts time always, and supplies time information, such as information about the photographed date/time of the photographed image, to the main CPU 62 based on the counted value. It is preferable that the timer 86 counts time with the power supplied from the battery, even when main power supply of the digital camera is switched off. It is also preferable that the character generating unit 84 and the timer 86 are annexed to the main CPU 62.

The storing unit 120 includes a memory control unit 64, nonvolatile memory 66, and main memory 68. The memory control unit 64 controls the nonvolatile memory 66 and the main memory 68. The nonvolatile memory 66 is composed of EEPROM (electrically erasable programmable read only memory) or flash memories etc., and stores it with data which is to be held even when the power supply of the digital camera 10 is switched off, such as setting information set by a user or a factory preset value. The nonvolatile memory 66 may store a boot program, a system program, etc. of the main CPU 62.

It is preferable that the main memory 68 is composed of memory which is relatively inexpensive and has large capacity, like DRAM. The main memory 68 has a function as frame memory to store the data outputted from the image pick-up unit 20, a function as system memory which loads various programs, and a function as a work area. The nonvolatile memory 66 and the main memory 68 communicate with each part inside/outside the system control unit 60 through a bus 82. The nonvolatile memory 66 may further store the digital image data.

The image processing unit 130 includes a YC processing unit 70, an encoder 72, and a compression/decompression processing unit 78. The external connection unit 140 includes an optional equipment control unit 74 and a communication interface 80. The encoder 72, the optional equipment control unit 74, and the communication interface 80 are examples of the output unit 202.

The YC processing unit 70 performs YC conversion to the digital image data, and generates a luminance signal Y, a color difference signals B-Y and R-Y. The main memory 68 stores the luminance signal and the color difference signals based on control of the memory control unit 64.

The compression/decompression processing unit 78 reads and compresses the luminance signal and the color difference signals sequentially from the main memory 68. Then the optional equipment control units 74 writes the compressed digital image data (referred to as "compressed data") in a memory card which is an example of the optional equipment 76.

The encoder 72 converts the luminance signal and the color difference signals into a video signal (NTSC or PAL signal), and outputs the video signal from a terminal 90. When generating the video signal from the compressed data recorded on the optional equipment 76, the compressed data is supplied to the compression/decompression processing unit 78 at first through the optional equipment control unit 74. Then, the data is decompressed in the compression/decompression processing unit 78 and the encoder 72 converts the decompressed data into the video signal.

The optional equipment control unit 74 performs generation, logical conversion, and/or voltage conversion of the signal that flows between the bus 82 and the optional equipment 76, in order to conform the signal to the specification of the optional equipment 76 and the bus 82. Other than the above-mentioned memory card, the digital camera 10 may support a standard PCMCIA I/O card, for example, as the optional equipment 76. In this case, the optional equipment control unit 74 may be composed of bus control LSI for PCMCIA standard or the like.

The communication interface 80 performs control such as protocol conversion to comply with the communication specification supported by the digital camera 10, e.g., USB, RS-232C, Ethernet, etc. The communication interface 80 may output the compressed data or the digital image data to external equipment or to a network through a terminal 92. The communication interface 80 includes a driver IC if necessary and communicates with external equipment through the terminal 92. The communication interface 80 may communicate with the external equipment, such as a printer, a karaoke machine or a video game machine, through an original standard interface.

The displaying unit 100 includes an LCD display 102, an LCD panel 104, a display driver 106, and a panel driver 108. The display driver 106 controls the LCD display 102. The panel driver 108 controls the LCD panel 104. The LCD display 102 is positioned on the back face of the camera, of which the size is about 2 inches for example, and displays an image currently photographed, a playback image, zoom magnification of the photographed or playback image, remaining battery charge, date/time, mode selection screen, a subject image, etc. The LCD panel 104 is a monochrome LCD, for example, is positioned on top face of the camera, and displays information, such as quality of the image (fine, normal, basic, etc.), flash mode (forced flash, suppressed flash, etc), number of available frames, number of pixels, and remaining battery charge.

The control unit 110 includes a power switch 112, a release switch 114, a function setting unit 116, and a zoom switch 118. The power switch 112 switches the digital camera 10 on and off based on direction of a user. The release switch 114 can be depressed in two levels, i.e., halfway depression and full depression. For example, when the release switch 114 is depressed halfway, the image pick-up control unit 40 performs automatic focusing and automatic exposure, and the image pick-up unit 20 picturizes a subject image by depressing the release switch 114 fully.

The function setting unit 116 is, for example, a rotatable mode dial or a 4-direction button and accepts settings such as "file format", "special effect", "print", "determine/save", "change display", etc. The zoom switch 118 accepts setting of zoom magnification of the subject image picturized by the image pick-up unit 20.

The digital camera 10 having the above-mentioned structure operates in the following manner. First, the power switch 112 is depressed and power is supplied to each part of the digital camera 10. The main CPU 62 judges whether the digital camera 10 is in photography mode or in playback mode by reading status of the function setting unit 116.

When a digital camera 10 is in photography mode, the main CPU 62 supervises the depression status of the release switch 114. When the half-depression of the release switch 114 is detected, the image pick-up system CPU 50 acquires photometry data and focusing data from the photometry sensor 54 and the focusing sensor 52, respectively. The image pick-up control unit 40 adjusts focus and stop of the image pick-up unit 20, etc. based on the photometry data and the focusing data acquired by the image pick-up system CPU 50. After the adjustment, the LCD display 102 informs a user about the completion of the adjustment by displaying characters, such as "standby".

Then, the main CPU 62 supervises the depression status of the release switch 114. When the full-depression of the release switch 114 is detected, the shutter 26 is closed after a predetermined shutter time is elapsed and the stored charge of the CCD 30 is discharged to the pick-up signal processing unit 32. The digital image data, generated as a result of processing by the pick-up signal processing unit 32, is outputted to the bus 82. The digital image data is once stored in the main memory 68, then it is processed in the YC processing unit 70 and the compression/decompression processing unit 78, and is recorded in the optional equipment 76 via the optional equipment control unit 74. The photographed image based on the recorded digital image data is displayed on the LCD display 102 for a while, so that a user can check the photographed image. As described above, a sequence of the photographing operation is finished.

On the other hand, when the digital camera 10 is in playback mode, the main CPU 62 reads the photographed image from the main memory 68, the nonvolatile memory 66, and/or the optional equipment 76, and displays the image on the LCD display 102 of the displaying unit 100.

In this state, when a user directs either "move forward" or "move backward" on the function setting unit 116, the main CPU 62 reads another photographed image stored in the main memory 68, the nonvolatile memory 66, and/or the optional equipment 76, and displays the image on the LCD display 102 of the displaying unit 100.

As described above, the present invention provides the image capturing apparatus for determining the position of the main subject on the image accurately.

Although the present invention has been described by way of an exemplary embodiment, it should be understood that those skilled in the art might make many changes and substitutions without departing from the spirit and the scope of the present invention which is defined only by the appended claims.

What is claimed is:

1. A still camera for capturing an image of a subject, comprising:

an image pick-up unit for capturing a preliminary image, a plurality of intermediate images which are not stored for later use, and a final image, the plurality of intermediate images being captured after capturing the preliminary image and before capturing the final image;

a main subject recognition unit for recognizing a main subject from the subject on the preliminary image;

a main subject position determination unit for following the position of the main subject on the intermediate images and determining a position of the main subject on the final image;

a notify means for notifying a user that the main subject have been framed out from the intermediate images, and an image capturing condition determination unit for analyzing the preliminary image and for determining an image capturing condition, wherein said image pick-up unit captures the final image based on the image capturing condition.

2. The still camera as claimed in claim 1, further comprising a storing unit for associating the position of the main subject determined by said main subject position determination unit with the final image and for storing the position of the main subject and the final image.

3. The still camera as claimed in claim 1, wherein said main subject position determination unit identifies a point as the position of the main subject.

4. The still camera as claimed in claim 1, wherein said main subject position determination unit identifies a circular area as the position of the main subject.

5. The still camera as claimed in claim 1, wherein said main subject position determination unit identifies a rectangular area as the position of the main subject.

6. The still camera as claimed in claim 1, wherein said main subject recognition unit recognizes an area including a focused area on the preliminary image as the main subject.

7. The still camera as claimed in claim 6, wherein said main subject recognition unit recognizes the focused area and a circumferential area around the focused area on the preliminary image as the main subject.

8. The still camera as claimed in claim 7, wherein said main subject recognition unit recognizes the focused area and an area containing the same color as that of the focused area as the main subject.

9. The still camera as claimed in claim 1, wherein said main subject recognition unit recognizes the main subject by detecting a visual axis of eyes of a photographer.

10. The still camera as claimed in claim 1, wherein said main subject recognition unit recognizes the main subject by detecting color of skin of the subject.

11. The still camera as claimed in claim 1, wherein said image pick-up unit further captures an intermediate image after the acquisition of the preliminary image and before the acquisition of the final image, said main subject position determination unit determines a position of the main subject on the intermediate image based on the position of the main subject on the preliminary image, and determines a position of the main subject on the final image based on the position of the main subject on the intermediate image.

12. The still camera as claimed in claim 1, further comprising:

an output unit which outputs the final image to external equipment such as a memory card or printer, and outputs the main subject position information, indicating the position of the main subject on the final image, and the image capturing condition information indicating the image capturing conditions in association with the final image.

13. The still camera as claimed in claim 12, wherein the image capturing condition information includes at least one of brightness information, flash information, subject distance information, and focal length information.

14. A computer readable medium storing thereon a computer-executable program for a still camera which captures a subject, the medium comprising: an image pick-up module for allowing the still camera to capture a preliminary image, a plurality of intermediate images which are not stored for later use, and a final image, the plurality of intermediate images being captured after capturing the preliminary image and before capturing the final image; a main subject recognition module for allowing the still camera to recognize a main subject from the subject on the preliminary image; a main subject position determination module for allowing the still camera to determine a position of the main subject on the final image; a notify means for notifying a user that the main subject have been framed out from the intermediate images; and an image capturing condition determination unit for analyzing the preliminary image and for determining an image capturing condition, wherein said image pick-up unit captures the final image based on the image capturing condition.

* * * * *